United States Patent [19]
Yoshida et al.

[11] Patent Number: 5,214,467
[45] Date of Patent: May 25, 1993

[54] DISTANCE MEASURING DEVICE OF CAMERA

[75] Inventors: Hideo Yoshida; Minoru Ishiguro, both of Omiya, Japan

[73] Assignee: Fuji Photo Optical Co., Ltd., Saitama, Japan

[21] Appl. No.: 791,238

[22] Filed: Nov. 13, 1991

[30] Foreign Application Priority Data

Nov. 14, 1990 [JP] Japan .................... 2-308279

[51] Int. Cl.⁵ ............................ G03B 13/36
[52] U.S. Cl. ................................ 354/403
[58] Field of Search ........................ 354/403

[56] References Cited

U.S. PATENT DOCUMENTS 4,983,033 1/1991 Suzuki .................. 354/403
5,148,211 9/1992 Kotani et al. ............ 354/403

*Primary Examiner*—Russell E. Adams

[57] ABSTRACT

A distance measuring device of camera for measuring distance to a pictured object includes pulse-driven first, second and third beam projecting elements. When a distance to the pictured object is long and beams of the beam projecting elements reflected from the pictured object are small in quantity or become nil, the first beam projecting element is pulse-driven until the number of light emission reaches a predetermined first maximum number of light emission, and the second and third beam projecting elements are pulse-driven until the number of light emission reaches a predetermined second maximum number of light emission which is less than the predetermined first maximum number of light emission. Because of this, when a distance to the pictured object is long and the beam projecting elements are pulse-driven to the predetermined first or second maximum number of light emission, it is possible to shorten a distance measuring time.

8 Claims, 5 Drawing Sheets

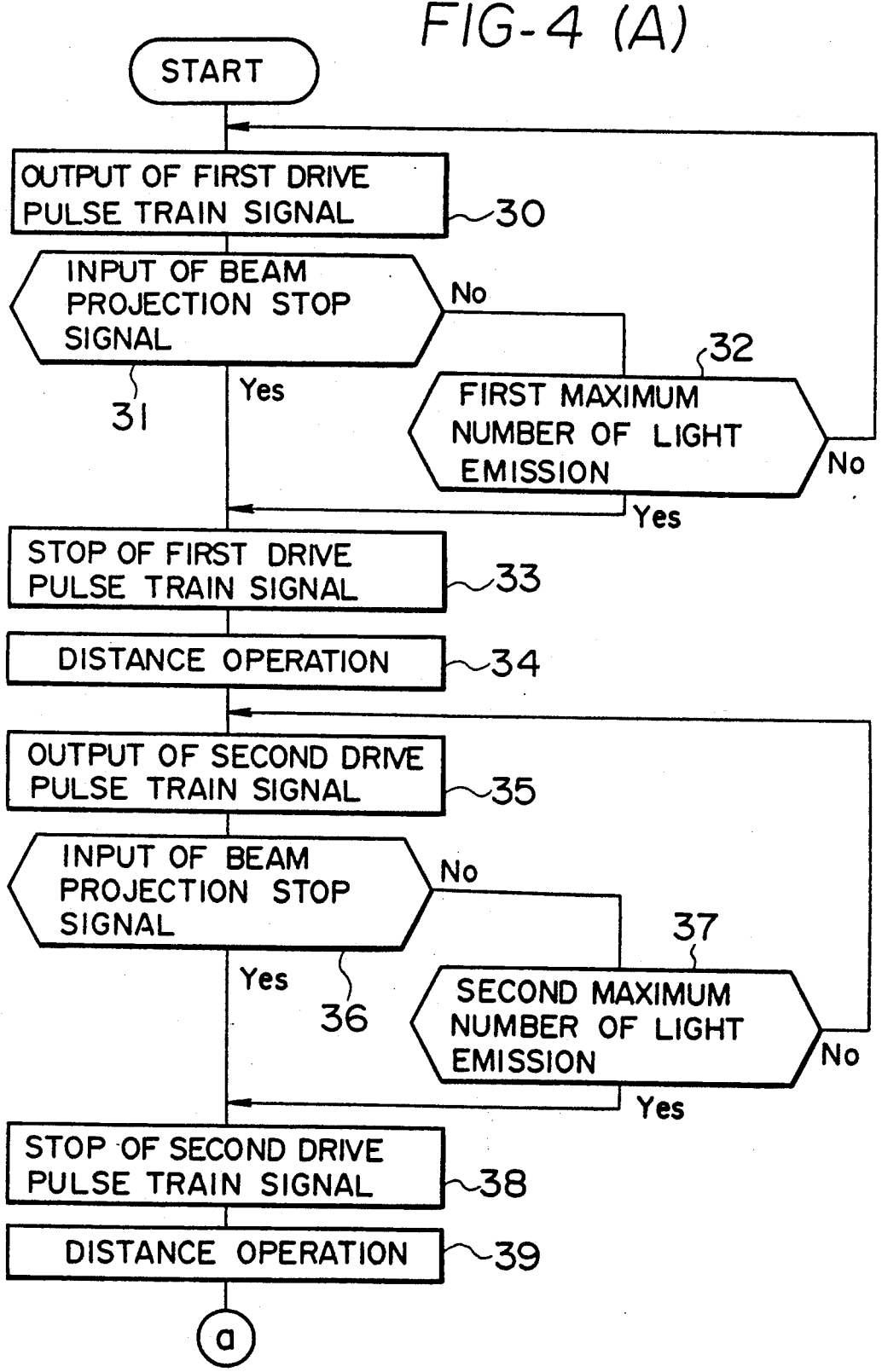

DISTANCE MEASURING DEVICE OF CAMERA

BACKGROUND OF THE INVENTION

The present invention relates to a distance measuring device of a camera for measuring a distance to a pictured object.

For an active type auto-focusing camera which is widely in use, there is provided only one beam projecting element, and the beam projecting element is pulse-driven responding to pushing on of a first step of a two-step release switch. When the number of light emission of the beam projecting element reaches a predetermined maximum number of light emission, 1,000 light emissions for example, or when an integrated value of an output of beam receiving means for receiving beam from the beam projecting element, reflected by a pictured object, reaches a predetermined value, pulse-drive of the beam projecting element is stopped. And, thereby a distance to the pictured object is recognized based on the output of the beam receiving means. When the distance to the pictured object is short, the received reflected beam is larger in quantity, so the integrated value of output of the beam receiving means reaches the predetermined value before the number of light emission of the beam projecting element reaches the maximum number of light emission. When the distance to the pictured object is long, the received reflected beam is small in quantity or becomes nil, so the beam projecting element is pulse-driven till the maximum number of light emission.

However, in the case of an auto-focusing camera like this, especially when measuring a distance to two pictured objects which are standing right and left with a space between them, an erroneous distance measurement results if the beam from the beam projecting element goes through the space between these two pictured objects.

From a viewpoint to avoid an erroneous distance measurement like this case, a distance measurement using multiple beams may be considered. In this measurement, there are provided three beam projecting elements for example, which are arranged in a row for projecting beams through the same projecting lens. There are generated three distance informations by pulse-driven these beam projecting elements one after another, and, a distance information with the smallest distance to give an example is selected out of these three distance informations. In such a measurement, however, when each of the beam projecting elements is pulse-driven to the maximum number of light emission because of a long distance to pictured objects, a time for the maximum number of light emission ×3 is required, resulting in a long distance measuring time. Because of this, a time parallax between a release switch operation and a picture taking is increased, resulting in inability to take pictures with desired compositions, for example, of a moving object.

SUMMARY OF THE INVENTION

It is an object of the present invention to provide an improved distance measuring device of camera using multiple beams.

Another object of the present invention is to provide a distance measuring device of camera, using multiple beams which can minimize the time parallax between a release switch operation and a picture taking.

The above objects are attained by a distance measuring device of camera for measuring a distance to a pictured object, comprising; beam projecting means which includes at least a first, second and third beam projecting elements in a single row arrangement for projecting beams through the same projection lens, one beam projecting element positioned on the center in said single row arrangement being arranged on an optical axis of the projection lens; beam receiving means for receiving beams from said beam projecting means, reflected from the pictured object; distance measuring means, including a first, second and third distance measuring means, responsive to a release switch operation, for driving said first, second and third distance measuring means in sequence so that their distance measuring operation is not overlapped with each other and for inputting a receiving output from said beam receiving means; said first distance measuring means pulse-driving said first beam projecting means, stopping pulse-drive of said first beam projecting means when a number of light emission of said first beam projecting element reaches a predetermined first maximum number of light emission or when an integrated value of the receiving output from said beam receiving means reaches or exceeds a predetermined value, and giving a first distance information corresponding to pulse-drive of said first beam projecting element based on the receiving output of said beam receiving means; said second distance measuring means pulse-driving said second beam projecting element, stopping pulse-drive of said second beam projecting element when a number of light emission of said second beam projecting element reaches a predetermined second maximum number of light emission, less than said predetermined first maximum number of light emission, or when an integrated value of the receiving output from said beam receiving means reaches or exceeds the predetermined value, and giving a second distance information corresponding to pulse-drive of said second beam projecting element based on the receiving output of said beam receiving means; said third distance measuring means pulse-driving said third beam projecting element, stopping pulse-drive of said third beam projecting element when a number of light emission of said third beam projecting element reaches said predetermined second maximum number of light emission or when an integrated value of the receiving output from said beam receiving means reaches or exceeds the predetermined value, and giving a third distance information corresponding to pulse-drive of said third beam projecting element based on the receiving output of said beam receiving means; and distance determining means, responsive to said first, second and third distance informations from said distance measuring means, for determining a distance to the pictured object from said first, second and third distance informations.

BRIEF DESCRIPTION OF THE DRAWINGS

The foregoing objects, features and attendant advantages of the present invention will be appreciated as the same become better understood by means of the following description and accompanying drawings wherein.

DETAILED DESCRIPTION OF THE INVENTION

Figure 1:
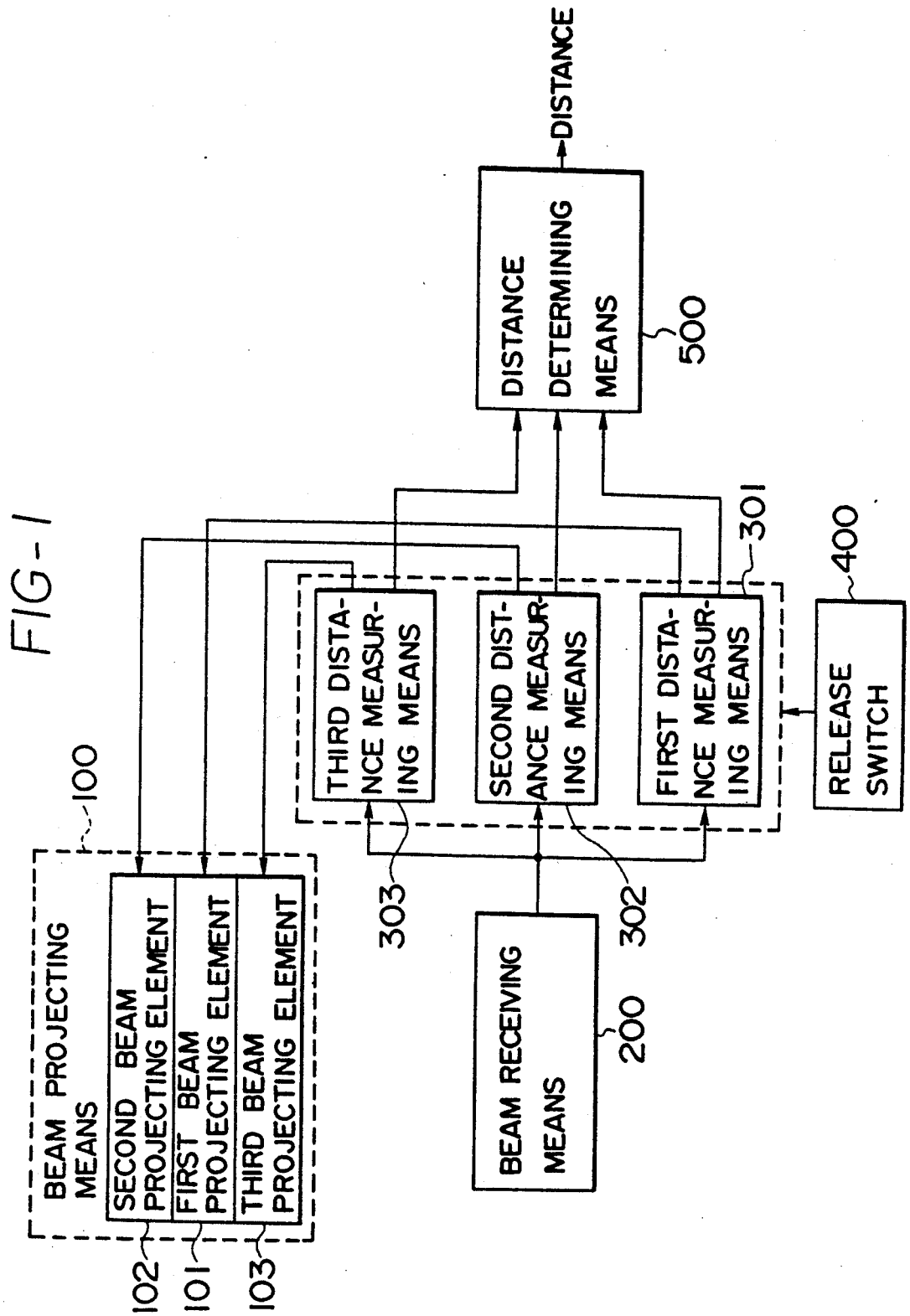
FIG. 1 is a block diagram showing a fundamental embodiment of a distance measuring device of camera according to the present invention.

In a fundamental embodiment of FIG. 1, beam projecting means 100 has at least a first, second and third beam projecting elements 101, 102 and 103 in a single row arrangement for projecting beams through the same projecting lens. The first beam projecting element 101 which is positioned on the center is arranged on the optical axis of the projection lens. Beam receiving means 200 receive beams from the beam projecting means 100, reflected from a pictured object. Distance measuring means 300, including first, second and third distance measuring means 301, 302 and 303 and, drive the first, second and third distance measuring means 301 through 303 in sequence corresponding to an operation of a release switch 400 so that their distance measuring operation is not overlapped with each other and inputs receiving outputs from the beam receiving means 200. The first distance measuring means 301 of the distance measuring means 300 pulse-drive the beam projecting element 101 of the beam projecting means 100, stop pulse-drive of the first beam projecting element 101 when a number of light emission of the first beam projecting element 101 reaches a first maximum number of light emission which is set beforehand or when an integrated value of receiving output from the beam receiving means 200 reaches or exceeds a predetermined value, and provide first distance information based on a receiving output of the beam receiving means 200 corresponding to pulse-drive of the first beam projecting element 101. The second distance measuring means 302 of the distance measuring means 300 pulse-drive the beam projecting element 102 of the beam projecting means 100, stop pulse-drive of the second beam projecting element 102 when a number of light emission of the second beam projecting element 102 reaches a second maximum number of light emission, set to a smaller number than the first maximum number of light emission, or when an integrated value of receiving output from the beam receiving means 200 reaches or exceeds the predetermined value, and provide a second distance information based on a receiving output of the beam receiving means 200 corresponding to pulse-drive of the second beam projecting element 102. The third distance measuring means 303 of the distance measuring means 300 pulse-drives the beam projecting element 103 of the beam projecting means 100, stop pulse-drive of the third beam projecting element 103 when a number of light emission of the third beam projecting element 103 reaches the second maximum number of light emission or when an integrated value of receiving output from the beam receiving means 200 reaches or exceeds the predetermined value, and provide a third distance information based on a receiving output of the beam receiving means 200 corresponding to pulse-drive of the third beam projecting element 103. Distance determining means 500 determine a distance to a pictured object from the first through third distance informations of the first, second and third distance measuring means 301 through 303. According to a composition like this, when a distance to the pictured object is long and each of beam projecting elements is pulse-driven to their maximum number of light emission, the first beam projecting element 101 of its pulse-drive is stopped when the number of light emission reaches the first maximum number of light emission, and the second and third beam projecting elements 102 and 103 of their pulse-drive is stopped when the number of light emission reaches the second maximum number of light emission, set to a number smaller than the first maximum number of light emission. Because of this, it is possible to shorten the distance measuring time, and it is possible to reduce the time parallax between a release switch operation and a picture taking. The contents of the above-mentioned fundamental embodiment may be understood more clearly by a preferred embodiment of FIG. 2 through FIG. 4.

Figure 2:
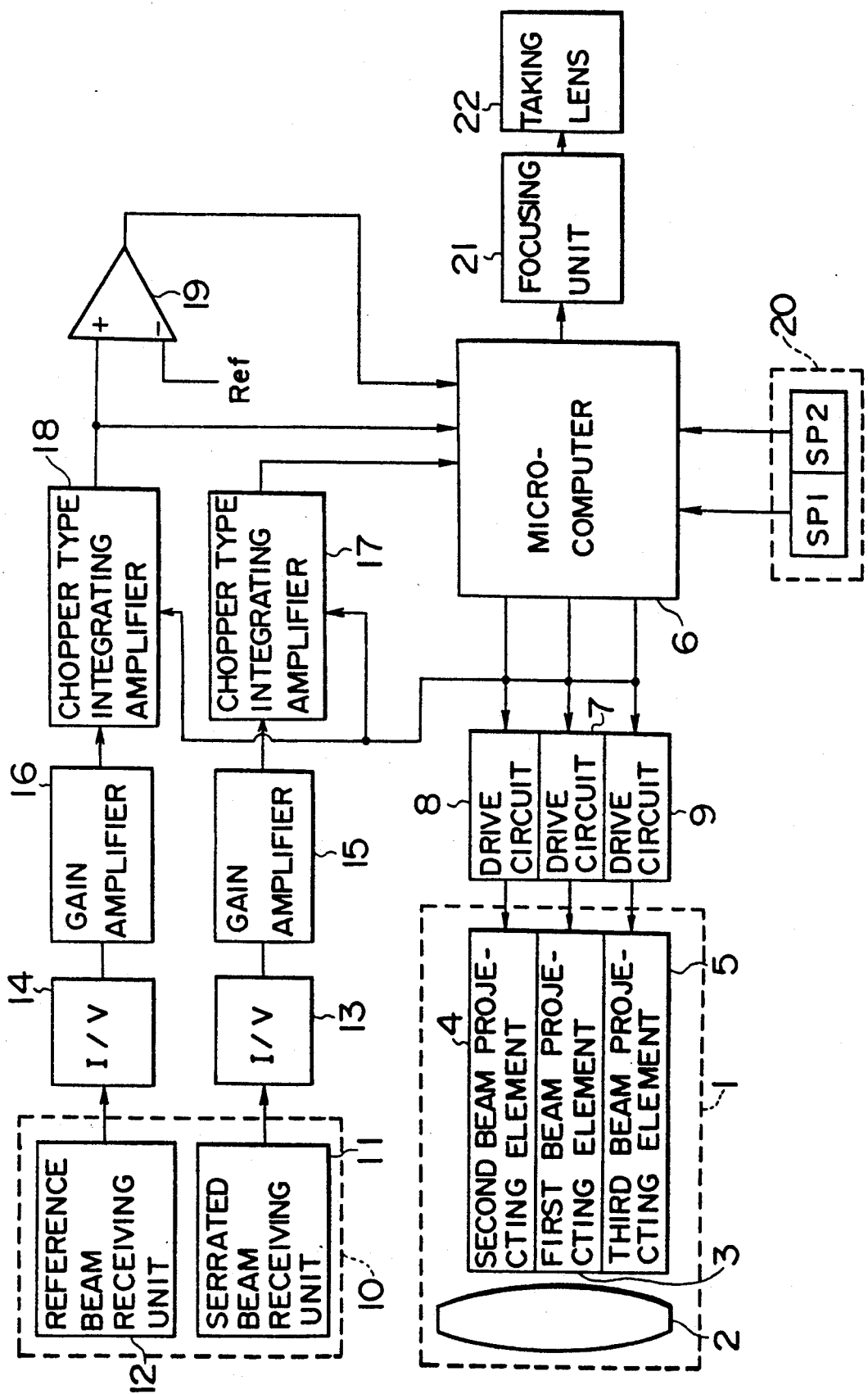
FIG. 2 is a block diagram showing a preferred embodiment of a distance measurement device of camera according to the present invention.

In the preferred embodiment of FIG. 2, a reference numeral 1 denotes a beam projecting means. The beam projecting means 1 has three beam projecting elements 3, 4 and 5 in single row arrangement for projecting beams through the same projection lens 2. The beam projecting elements 3 through 5 are positioned provided so that they are laterally in a row when a camera is maintained in its normal position. The first beam projecting element 3 which is positioned on the center is provided on the optical axis of the projection lens 2. Therefore, the beam of the first beam projecting element 3 is situated on the optical axis of the projection lens 2, and the beams of the second and third beam projecting elements 4 and 5 become opened to the beam of the first beam projecting element 3 as distance extends. The first beam projecting element 3 is pulse-driven by a drive circuit 7 which receives a first drive pulse train given from a microcomputer 6. The second beam projecting element 4 is pulse-driven by a drive circuit 8 which receives a second drive pulse train fed from the microcomputer 6. The third beam projecting element 5 is pulse-driven by a drive circuit 9 which receives a third drive pulse train from the microcomputer 6.

Figure 3:
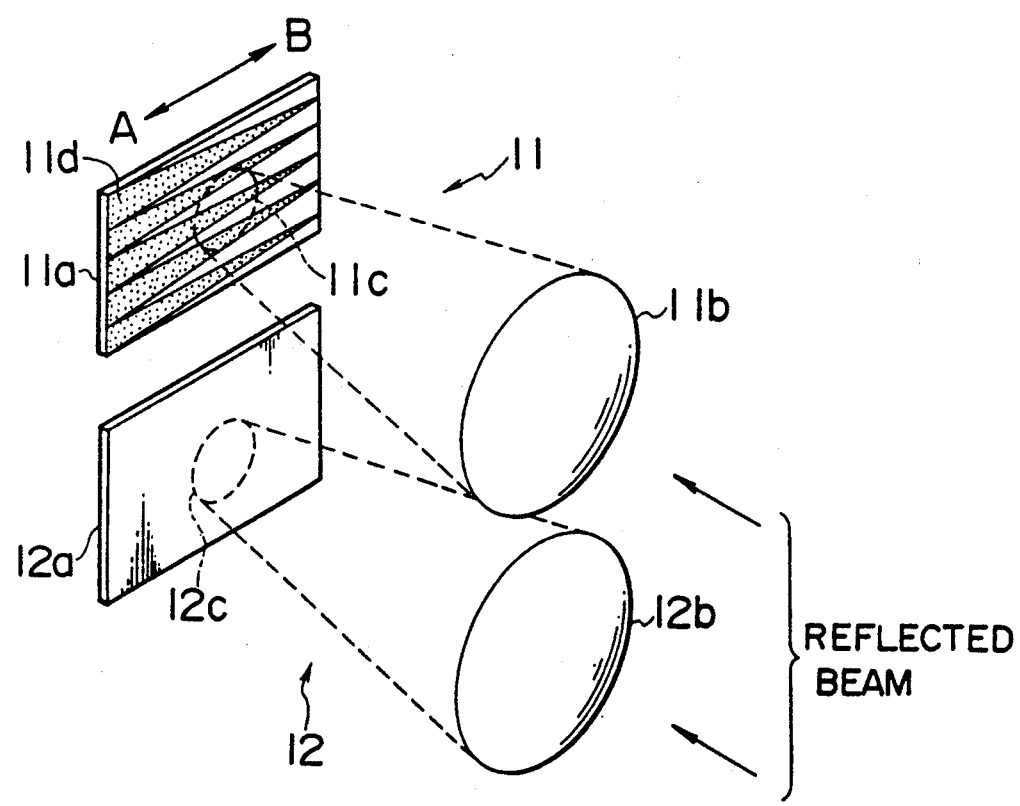
FIG. 3 is a perspective view showing composition of beam receiving means in FIG. 2.

Reference number 10 denotes beam receiving means. The beam receiving means 10 has a serrated beam receiving unit 11 and a reference beam receiving unit 12. The serrated beam receiving unit 11 and the reference beam receiving unit 12, as shown in FIG. 3, are designed so that a beam receiving element 11a of the serrated beam receiving unit 11 and a beam receiving element 12a of the reference beam receiving unit 12 are arranged at the top and bottom and received images 11c and 12c by reflected beams from a pictured object are fed to their receiving faces via corresponding receiving lenses 11b and 12b. On the receiving face of the beam receiving element 11a of the serrated beam receiving unit 11, there is provided a serrated shading filter 11d, and nothing is provided on the beam receiving element 12a of the reference beam receiving unit 12. The received images 11c and 12c of the serrated beam receiving unit 11 and reference beam receiving unit 12 are displaced in an A-B direction in the Figure when incident angles of reflected beams are varied according to a distance to the pictured object. Therefore, it is possible to obtain distance information to the pictured object by cancelling the influence due to reflectance from an output of the serrated beam receiving unit 11 using an output of the reference beam receiving unit 12. The outputs of the serrated beam receiving unit 11 and reference beam receiving unit 12 are coupled to chopper type integrating amplifiers 17 and 18 via current/voltage converting amplifiers 13 and 14 and gain amplifiers 15 and 16, respectively. The chopper type integrating amplifiers 17 and 18 generate integrated outputs by operating their choppers by a drive pulse train signal fed from the microcomputer 6 to the drive circuits 7 through 9. The chopper type integrating amplifier 17 which corresponds to the serrated beam receiving unit 11 feeds its integrated output to the microcomputer 6. The chopper type integrating amplifier 18 which corresponds to the reference beam receiving unit 12 feeds its integrated output to the microcomputer 6 and a comparator 19. The comparator 19 feeds a beam projection stop signal to the microcomputer 6 when the integrated output of the chopper type integrating amplifier 18 reaches or exceeds a predetermined value.

A reference numeral 20 is a two-step release switch. The release switch 20 generates a start signal for the microcomputer 6 by pushing on the first-step SP1, and generates a release signal for the microcomputer 6 by pushing on the second-step SP2. Reference numeral 21 is a focusing unit. The focusing unit 21, receiving an auto-focus control signal from the microcomputer 6, brings a picture taking lens 22 to a position corresponding to the auto-focus control signal.

Figure 4:
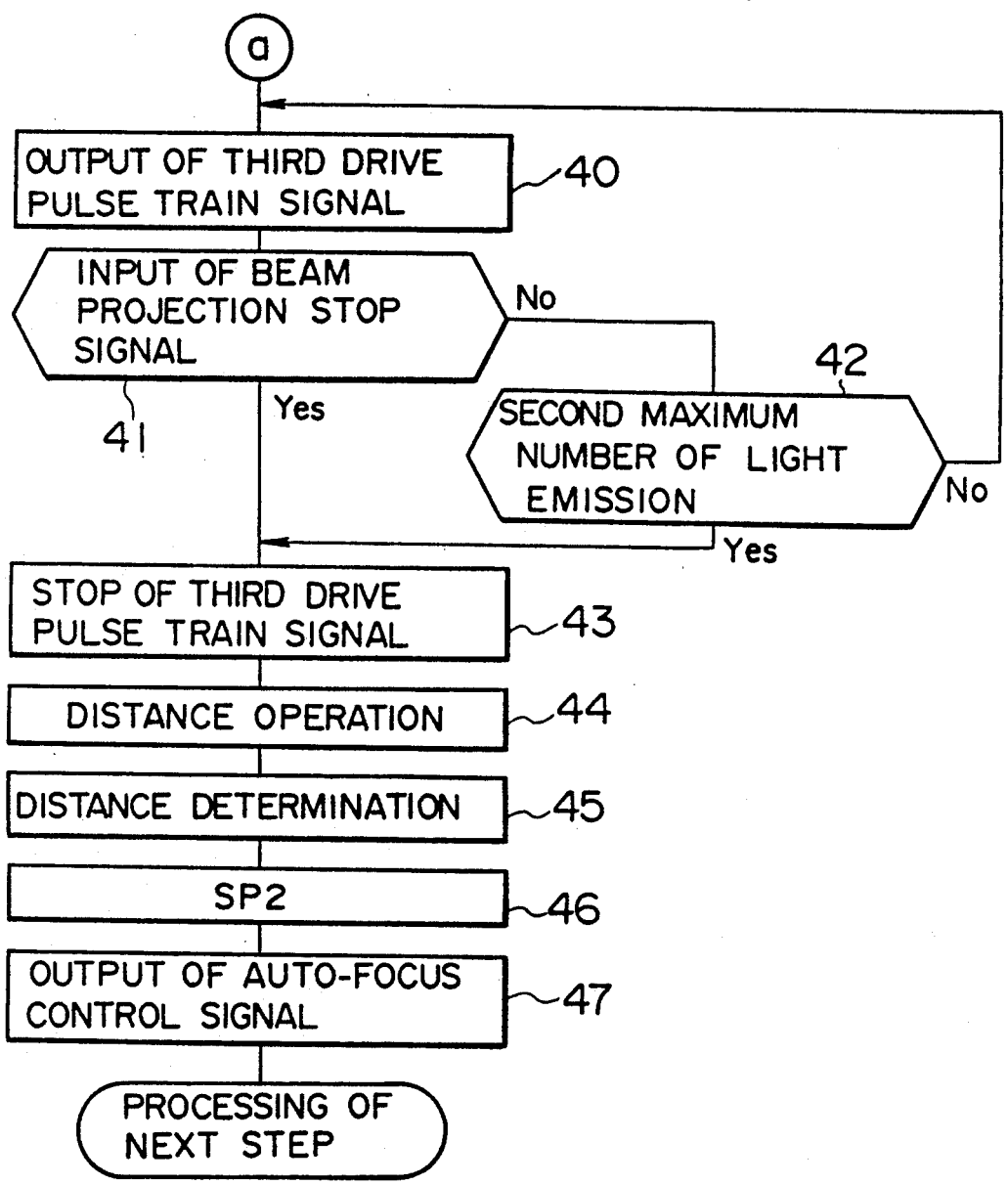
FIG. 4 (A) and FIG. 4 (B) are control flow diagrams of a microcomputer of FIG. 2.

FIG. 4 (A) and FIG. 4 (B) are flow diagrams of the microcomputer 6 of FIG. 2. A terminal a of FIG. 4 (A) is connected to a terminal having the same sign a of FIG. 4 (B).

When the start signal is fed to the microcomputer 6 by pushing on of the first-step SP1 of the release switch 20, the microcomputer 6 is started. The microcomputer 6 couples the first drive pulse train signal to the drive circuit 7 and the chopper type integrating amplifiers 17 and 18 in a step 30. By this, the first beam projecting element 3 is pulse-driven, and a reflected beam from the pictured object due to the pulse-drive of first beam projecting element 3 is received by the serrated beam receiving unit 11 and the reference beam receiving unit 12. The receiving output of the serrated beam receiving unit 11 is fed via the current/voltage converting amplifier 13 and the gain amplifier 15 to the chopper type integrating amplifier 17, and, after being integrated by the chopper type integrating amplifier 17, fed to the microcomputer 6. The receiving output of the reference beam receiving unit 12 is fed via the current/voltage converting amplifier 14 and the gain amplifier 16 to the chopper type integrating amplifier 18, and, after being integrated by the chopper type integrating amplifier 18, fed to the microcomputer 6 and comparator 19. The microcomputer 6 determining whether or not the beam projection stop signal is input from the comparator 19 in a following step 31. If the beam projection stop signal is not input, the microcomputer 6 goes to processing of a step 32, or, if the beam projection stop signal is input, it goes to processing of a step 33. In the step 32, whether the number of light emission of the first beam projecting element 3 has reached a first maximum number of light emission (1,000 emissions in this embodiment) or not is determined. If the number of light emission of the first beam projecting element 3 has not reached 1,000 emissions, the microcomputer 6 returns to step 30, and goes to the processing of step 33 when 1,000 emissions are reached. As the reflected beam is large when a distance to the pictured object is short, the integrated output of the chopper type integrating amplifier 18 reaches the predetermined value of the comparator 19 before the number of light emission of the first beam projecting element 3 reaches 1,000 emissions. Whereas, when the reflected beam is small or become nil when a distance to the pictured object is long, the first beam projecting element 3 is pulse-driven to 1,000 emissions. The microcomputer 6 stops the output of the first pulse train signal in step 33, and in a following step 34, obtains a first distance information to the pictured object due to the pulse-drive of the first beam projecting element 3 by cancelling influence of reflectance from the integrated output of the serrated beam receiving unit 11 from the chopper type integrating amplifier 17, using the integrated output of the reference beam receiving unit 12 from the chopper type integrating amplifier 18.

The microcomputer 6 goes from step 34 to step 35, and couples a second drive pulse train signal to the drive circuit 8 and the chopper type integrating amplifiers 17 and 18. By this, the second beam projecting element 4 is pulse-driven, and a reflected beam from the pictured object due to the pulse-drive of second beam projecting element 4 is received by the serrated beam receiving unit 11 and the reference beam receiving unit 12. And, as described above, the outputs of the serrated beam receiving unit 11 and the reference beam receiving unit 12 are fed to the microcomputer 6 and the comparator 19. In a following step 36, the microcomputer 6 determines whether or not the beam projection stop signal is input from the comparator 19. If the beam stop projection signal is not input, the microcomputer 6 goes to a processing of step 37, or, if the beam projection stop signal is input, goes to a processing of step 38. In the step 37, whether the number of light emission of the second beam projecting element 4 has reached a second maximum number of light emission (500 emissions in this embodiment), set to be smaller than the first maximum number of light emission, is determined. If the number of light emission of the second beam projecting element 4 has not reached 500 emissions, the microcomputer 6 returns to the processing of step 35, and goes to the processing of step 38 when 500 emissions are reached. As the reflected beam is large when a distance to the pictured object is short, the integrated output of the chopper type integrating amplifier 18 reaches the predetermined value of the comparator 19 before the number of light emission of the second beam projecting element 4 reaches 500 emissions. Whereas, as the reflected beam is small or become nil when a distance to the pictured object is long, the second beam projecting element 4 is pulse-driven to 500 emissions. The microcomputer 6 stops the output of the second pulse train signal in the step 38, and in a following step 39, obtains a second distance information to the pictured object due to the pulse-drive of the second beam projecting element 4 by cancelling influence of reflectance from the integrated output of the serrated beam receiving unit 11 from the chopper type integrating amplifier 17, using the integrated output of the reference beam receiving unit 12 from the chopper type integrating amplifier 18.

The microcomputer 6 goes from the step 39 to step 40, and gives a third drive pulse train signal to the drive circuit 9 and the chopper type integrating amplifiers 17 and 18. By this, the third beam projecting element 5 is pulse-driven, and a reflected beam from the pictured object due to the pulse-drive of third beam projecting element 5 is received by the serrated beam receiving unit 11 and the reference beam receiving unit 12. And, as described precedingly, the outputs of the serrated beam receiving unit 11 and the reference beam receiving unit 12 are fed to the microcomputer 6 and the comparator 19. In a following step 41, the microcomputer 6 determines whether or not projection stop signal is input from the comparator 19. If the beam projection stop signal is not input, the microcomputer 6 goes to a processing of step 42, or, if the beam projection stop signal is input, goes to a processing of step 43. In the step 42, whether the number of light emission of the third beam projecting element 5 has reached the second maximum number of light emission or 500 emissions is determined. If the number of light emission of the third beam projecting element 5 has not reached 500 emissions, the microcomputer 6 returns to the processing of step 40, and goes to the processing of step 43 when 500 emissions are reached. As the reflected beam is large when a distance to the pictured object is short, the integrated output of the chopper type integrating amplifier 18 reaches the predetermined value of the comparator 19 before the number of light emission of the third beam projected element 5 reaches 500 emissions. Whereas, as the reflected beam is small or become nil when a distance to the pictured object is long, the third beam projecting element 5 is pulse-driven to 500 emissions. The microcomputer 6 stops the output of the second pulse train signal in the step 43, and in a following step 44, obtains a third distance information to the pictured object by the third beam projecting element 5 by cancelling influence of reflectance from the integrated output of the serrated beam receiving unit 11 from the chopper type integrating amplifier 17, using the integrated output of the reference beam receiving unit 12 from the chopper type integrating amplifier 18.

For the picturing an object at a long distance, beams of the second and third beam projecting elements 4 and 5 are opened to the beam of the first beam projecting element 3 and seldom hit an aimed object. Therefore, there is no hindrance in the distance measurement even if the maximum number of light emission of the second and third beam projecting elements 4 and 5 is set to be half the maximum number of light emission of the first beam projecting element 3. The microcomputer 6 after the processing of step 44 goes to a processing of step 45 and determines a distance to the pictured object by selecting a distance information with a smallest distance out of the three distance informations obtained in the steps 34, 39 and 44. And, in following steps 46 and 47, the microcomputer 6 sends the auto-focus control signal to the focusing unit 21, responding to the on state of the second-step SP2 of the release switch 20, which then goes to a well-known camera (not shown in the Figure). The focusing unit 21, responding to the auto-focus control signal from the microcomputer 6, brings the picture taking lens 22 to a focus position determined in the step 45.

As described in detail, according to the present invention, the first maximum number of light emission is fed to the first beam projecting element, and the second maximum number of light emission, smaller than the first maximum number of light emission, is fed to the second and third beam projecting elements. Because of this, even when a distance to a pictured object is long and each of beam projecting elements are fed to the maximum number of light emission, it is possible to shorten distance measuring time, and thereby making it possible to minimize the time parallax between the release switch operation and picture taking.

From the foregoing it will now be apparent that a new and improved distance measuring device of camera has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A distance measuring device in a camera for measuring the distance to a picture object, comprising:
   beam projecting means which includes at least first, second and third beam projecting elements in a single row arrangement for projecting beams though the same projection lens, one beam projecting element being positioned on the center in said single row arrangement and arranged on an optical axis of the projection lens;
   beam receiving means for receiving said beams from said beam projecting means and reflected from the pictured object;
   distance measuring means, including a first, second and third distance measuring means, responsive to a release switch operation, for driving said first, second and third distance measuring means in sequence so that their distance measuring operation does not overlap with each other and for inputting a receiving output from said beam receiving means;
   said first distance measuring means pulse-driving said fist beam projecting means, stopping pulse-drive of said first beam projecting means when a number of light emission of said first beam projecting element reaches a predetermined first maximum number of light emission or when an integrated value of the receiving output from said beam receiving means reaches or exceeds a predetermined value, and generating first distance information corresponding to pulse-drive of said first beam projecting element based on the receiving output of said beam receiving means;
   said second distance measuring means pulse-driving said second beam projecting element, stopping pulse-drive of said second beam projecting element when a number of light emission of said second beam projecting element reaches a predetermined second maximum number of light emission, less than said predetermined first maximum number of light emission, or when an integrated value of the receiving output from said beam receiving means reaches or exceeds a predetermined value, and generating second distance information corresponding to pulse-drive of said second beam projecting element based on the receiving output of said beam receiving means; and
   said third distance measuring means pulse-driving said third beam projecting element, stopping pulse-drive of said third beam projecting element when a number of light emission of said third beam projecting element reaches said predetermined second maximum number of light emission or when an integrated value of the receiving output from said beam receiving means reaches or exceeds the predetermined value, and generating third distance information corresponding to pulse-drive of said third-beam projecting element based on the receiving output of said beam receiving means; and
   distance determining means, responsive to said first, second and third distance informations from said distance measuring means, for determining a distance to the pictured object from said first, second and third distance informations.

2. The device of claim 1, wherein said one beam projecting element arranged on the center comprises the first beam projection element.

3. The device of claim 1, wherein said beam receiving means ha a serrated beam receiving unit and a reference beam receiving unit, said serrated beam receiving unit providing a serrated shading filter on its receiving face, and said reference beam receiving unit providing being devoid of a filter on its receiving face.

4. The device of claim 3, wherein said distance measuring means includes:
   first chopper type integrator means, responsive to an output of said serrated beam receiving unit, for integrating the output of said serrated beam receiving unit,
   second chopper type integrator means, responsive to an output of said reference beam receiving unit, for integrating the output of said reference beam receiving unit, and
   comparator means, responsive to the integrated output of said second chopper type integrator means, for generating and coupling a beam projection stop signal to said first, second and third distance measuring means for stopping pulse-drive of the beam projecting elements when the integrated output of said second chopper type integrator means reaches or exceeds the predetermined value, and
   said first and second chopper type integrator means being further operated by a drive pulse train signal for pulse-driving said first, second and third beam projecting elements.

5. The device of claim 4, wherein said first distance measuring means includes;
   first beam projection stop signal determining means, responsive to said comparator means, for determining whether or not said beam projection stop signal is input from said comparator means,
   first light emission number determining means, responsive to said predetermined first maximum number of light emission, for determining whether or not the number of light emission of said first beam projecting element reaches said predetermined first maximum number of light emission, and
   first stopping means, responsive to said first beam projection stop signal determining means and said first light emission number determining means, for stopping pulse-drive of said first beam projecting element when said beam projection stop signal is input or when the number of light emission of said first beam projecting element reaches the predetermined first maximum number of light emission;
   wherein said second distance measuring means includes;
   second beam projection stop signal determining means, responsive to said comparator means, for determining whether or not said beam projection stop signal is input from said comparator means,
   second light emission number judging means, responsive to said predetermined second maximum number of light emission, for determining whether or not the number of light emission of said second beam projecting element reaches said predetermined second maximum number of light emission, and
   second stopping means, responsive to said second beam projection stop signal determining means and said second light emission number determining means, for stopping pulse-drive of said second beam projecting element when said beam projection stop signal is input or when the number of light emission of said second beam projection element reaches the predetermined second maximum number of light emission; and wherein said third distance measuring means includes;
   third beam projection stop signal determining means, responsive to said comparator means, for determining whether or not said beam projection stop signal is input from said comparator means,
   third light emission number determining means, responsive to said predetermined second maximum number of light emission, for determining whether or not the number of light emission of said third beam projecting element reaches said second predetermined maximum number of light emission, and
   third stopping means, responsive to said third beam projection stop signal determining means and said third light emission number determining means, for stopping pulsedrive of said third beam projecting element when said beam projection stop signal is input or when the number of light emission of said third beam projecting element reaches the predetermined second maximum number of light emission.

6. The device of claim 4, wherein said first, second and third distance measuring means generate said first, second and third distance information by cancelling the influence of reflectance from the integrated output of said serrated beam means and using the integrated output of said reference beam receiving unit from said second chopper type integrator means.

7. The device of claim 1, wherein said distance determining means determines the distance to the pictured object by selecting the distance information which is the smallest distance out of said first, second and third distance informations.

8. A distance measuring device of camera for measuring a distance to a pictured object, comprising:
   beam projecting means including at least a first, second and third beam projecting elements; and
   distance measuring means for pulse-driving said beam projecting elements, said distance measuring means pulse-driving said first beam projecting element until a number of light emissions of said first beam projecting element reaches a predetermined first maximum number of light emissions, and pulse-driving said second and third beam projecting elements until a number of light emissions of each of said second and third beam projecting elements reaches a predetermined second maximum number of light emissions which is less than said predetermined first maximum number of light emissions, when the distance to the pictured object is long and beams of said beam projecting elements reflected from the pictured object are small in number or become zero.

* * * * *